(12) United States Patent
Schuermann

(10) Patent No.: US 6,611,121 B2
(45) Date of Patent: Aug. 26, 2003

(54) NUMERICAL CONTROL AND METHOD OF AUTOMATICALLY FREEING AN AXIS AFTER RUNNING OVER SAFE END POSITIONS

(75) Inventor: Markus Schuermann, Erlangen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/938,762

(22) Filed: Aug. 24, 2001

(65) Prior Publication Data

US 2002/0074966 A1 Jun. 20, 2002

(30) Foreign Application Priority Data

Dec. 20, 2000 (DE) .......................... 100 63 674

(51) Int. Cl.$^7$ ............................................... G05B 19/18
(52) U.S. Cl. .................... 318/569; 318/568.1; 318/567; 318/575; 318/574
(58) Field of Search ............................ 318/568.1, 567, 318/569, 574, 575; 700/86

(56) References Cited

U.S. PATENT DOCUMENTS 6,374,146 B1 * 4/2002 Oyama et al. ................ 700/59
6,442,442 B1 * 8/2002 Weinhofer .................... 700/86

* cited by examiner

*Primary Examiner*—Karen Masih
(74) *Attorney, Agent, or Firm*—Baker Botts LLP

(57) ABSTRACT

For automatically freeing an axis which, after running over a safe end position (E+), is monitored to ascertain when it is at a standstill (3), monitoring for overshooting the safe end positions (E+, E−) is switched off and a freeing range (4) is defined by a limit value (G1), in the traversing direction of the axis which led to the overshooting of the safe end position (E+), with the value of the greater limit (S1) in absolute terms of the monitored standstill range (3), and by a limit value (G2), in the other traversing direction of the axis, with the value of the corresponding safe end position (E1). After deactivating the monitoring for a standstill of the axis, the axis can then be moved automatically back into the normal traversing range (1) within the safe end positions (E+, E−), while monitoring for overshooting of this freeing range (4).

10 Claims, 1 Drawing Sheet

Numerical Control

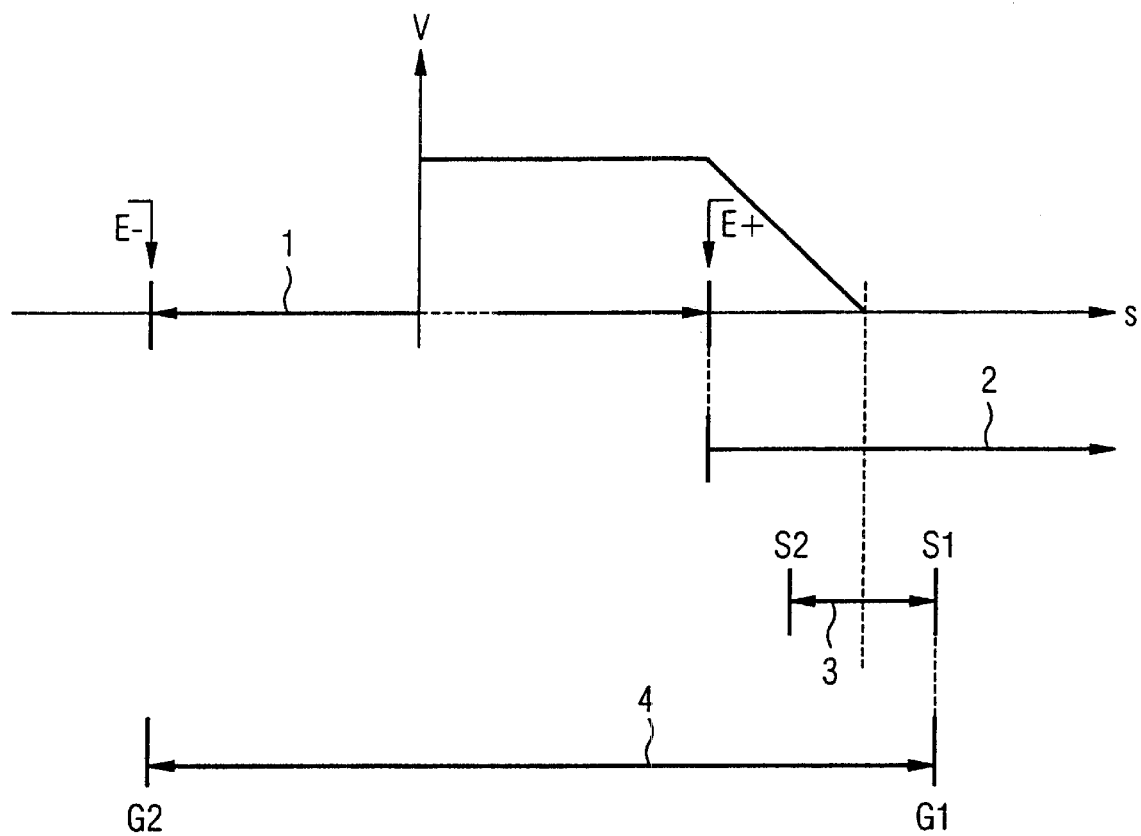
FIG. 1
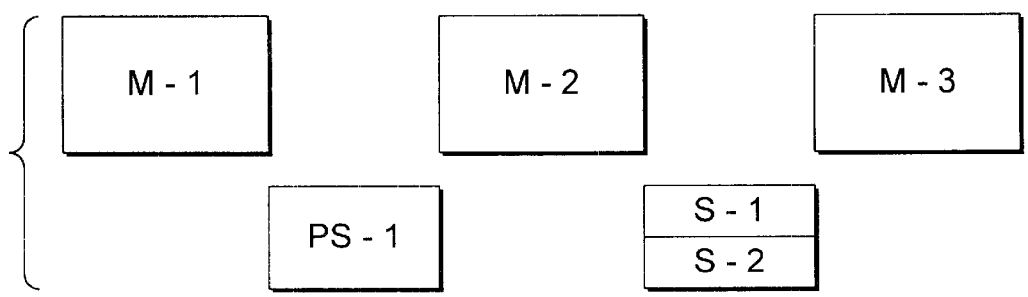
FIG. 2. Numerical Control

NUMERICAL CONTROL AND METHOD OF AUTOMATICALLY FREEING AN AXIS AFTER RUNNING OVER SAFE END POSITIONS

FIELD OF THE INVENTION

The invention relates to a method of automatically freeing an axis which, after running over a safe end position, is monitored to ascertain when it is at a standstill, and to a corresponding numerical control.

Modern numerical controls can be made available in conjunction with suitable drive system functions, enabling a machine tool manufacturer to equip a machine, such as a numerically controlled machine tool or a robot, with safety technology for protection of the machine and personnel.

One of the monitoring functions included in this is often the monitoring for "safe end positions", which monitors a numerically movable axis for its absolute position. In this case, the values for the safe end positions are generally parameterized as pairs of position values in machine data, to be specific one limit value in the negative traversing direction, the second limit value for the positive traversing direction of the axis. If one of these limit values is exceeded, a stop response is initiated, which brings the axis to a standstill. In addition, the overshooting of the safe end position is often indicated to the user by an alarm.

Further traversing of the axis in the same direction would lead to a hazardous situation for man and/or the machine, and must be prevented by the machine control system.

For this purpose, two procedures are known from the prior art. On the one hand, this takes place by dependable monitoring of the standstill of the axis or, on the other hand, it takes place by continuous triggering of the alarm belonging to the safe end position and the associated suppression of further traversing commands.

The user/machine operator then conventionally has two possible ways of bringing the machine from this standstill situation back into the normal operating state.

One known possible way is to switch over to alternatively provided safe end positions, which were previously parameterized in the commissioning phase of the machine in such a way that traversing of the axis is possible again, for example by a second pair of limit switches permitting a greater traversing range of the axis.

Apart from increasing the possible traversing range, this obliges the machine manufacturer to parameterize the second available safe end position in this way. Consequently, however, this second safe end position is no longer available for the parameterizing of another, independent traversing range.

Once the axis has been moved into the actual traversing range, limited by the first pair of safe limit switches, it is then possible to switch over to the original safe end position again.

An alternative known procedure comprises temporarily switching off the monitoring for safe end positions. Consequently, the monitoring is no longer active and the axis can be moved in any direction.

Further, the object of the present invention may be achieved as shown in FIG. 2 by a numerical control for the safe moving of an axis which has the following components:

- a monitor (M-1) for monitoring a permissible traversing range of the axis within safe end positions;
- a monitor (M-2) for monitoring for overshooting of a standstill range by the axis, which can be activated after running over a safe end position; and
- a monitor (M-3) for monitoring for overshooting of a freeing range which can be defined by a first limit value in the traversing direction of the axis which led to the overshooting of the safe end position (with the value of the greater limit in absolute terms of the monitored standstill range of the axis) and by a second limit value in the other traversing direction of the axis (with the value of the corresponding safe end position) where it is possible to move the axis back into the normal traversing range within the safe end positions after deactivation of the monitor for monitoring for overshooting of a standstill range, while monitoring for overshooting of this freeing range.

Once the axis has been moved into the actual traversing range of the axis, the monitoring can then be switched on again.

One problem inherent in these conventional measures is consequently the described laborious way of returning from the standstill situation to the normal operating state, on the one hand by use of further safe end positions to be parameterized, which restricts the flexibility and functional scope of the machine, and on the other hand by the alternative laborious operator control of the machine, which may only be carried out by a restricted group of persons.

The recordal of respective actual position values of the axis for activating the various monitors preferrably occurs by a position sensor system (PS-1) or by a pair of limit switches (S-1 and S-2) for recording when the axis runs over a safe end position for activating the monitor for monitoring a permissible traversing range of the axis. A particularly high degree of safety can be achieved by providing the respective monitors means in a two-channel form using dependable technology.

According to the present invention, this object is achieved by a method of automatically freeing an axis which, after running over a safe end position, is monitored to ascertain when it is at a standstill. This is achieved by the following method steps:

switching off monitoring for overshooting the safe end positions;

defining a freeing range by setting a first limit value, in the traversing direction of the axis which led to the overshooting of the safe end position, to the greater limit in absolute terms of the monitored standstill range of the axis and by setting a second limit value, in the other traversing direction of the axis, to the value of the corresponding safe end position;

activating monitoring for overshooting this freeing range;

deactivating the monitoring for a standstill of the axis;

moving the axis back into the normal traversing range within the safe end positions;

activating the monitoring for overshooting the safe end positions; and deactivating the monitoring for overshooting the freeing range.

Further advantages and details of the present invention will be apparent from the following drawing and description of a preferred embodiment wherein FIG. 1 is a diagram of the speed profile when a monitored axis moves beyond a safe end position. FIG. 2 schematically illustrates a numerical control of the present invention.

According to an advantageous refinement of the method according to the present invention, traversing commands in the traversing direction of the axis which led to the overshooting of the safe end position are additionally inhibited when the monitoring for overshooting of the freeing range is activated. This allows safety to be further enhanced.

Furthermore, the object of the invention is achieved by a numerical control for the safe moving of an axis which has the following components:

a means for monitoring a permissible traversing range of the axis within safe end positions;

a means for monitoring for overshooting of a standstill range by the axis, which can be activated after running over a safe end position; and a means for monitoring for overshooting of a freeing range which can be defined by a first limit value, in the traversing direction of the axis which led to the overshooting of the safe end position, with the value of the greater limit in absolute terms of the monitored standstill range of the axis, and by a second limit value, in the other traversing direction of the axis, with the value of the corresponding safe end position, it being possible to move the axis back into the normal traversing range within the safe end positions after deactivation of the means for monitoring for overshooting of a standstill range, while monitoring for overshooting of this freeing range.

It is also advantageous within the framework of such numerical control, for the reasons stated, to provide a means for signaling an overshooting of the permissible traversing range.

For further enhancing the safety of such numerical control according to the invention, a means for generating a status signal is provided. This status signal is allocated the value of the safe end position which was overshot. On the basis of this value of the status signal, traversing commands in the traversing direction of the axis corresponding to the value of the status signal can then be inhibited when there is active monitoring for overshooting of the freeing range.

Recording of respective actual position values of the axis for activating the various monitoring means advantageously takes place either by means of a position sensor system or by a pair of limit switches for recording when the axis runs over a safe end position for activating the means for monitoring a permissible traversing range of the axis.

A particularly high degree of safety can be achieved by providing the respective monitoring means in a two-channel form using dependable technology.

A particularly great benefit over the known prior art is that the concept according to the present invention can be performed automatically by numerical control.

Such numerical control according to the invention can be used particularly advantageously in the case of a numerically controlled machine tool or a robot.

Further advantages and details of the invention emerge from the following representation of an advantageous exemplary embodiment and in conjunction with the figure, in which FIG. 1 shows in a basic representation a diagram of the speed profile when a monitored axis moves beyond a safe end position.

The representation according to FIG. 1 serves for illustrating the various monitored traversing ranges and limits for automatic freeing of a numerical axis. For this purpose, a speed profile v is plotted over the theoretically possible traversing path s, which results when a monitored axis is moved in the positive direction.

A permissible traversing range 1 when monitoring for safe end positions is limited by two positions E+ and E− for safe end positions. In the positive traversing range, this is E+, in the negative traversing range it is E−. If, for example, the positive safe end position E+ is run over by the axis, the speed v of the axis is reduced as quickly as possible to zero and the axis is brought to a standstill as a result.

With the aid of the present invention, a machine operator can automatically bring the machine into the normal operating state from the standstill situation after running over the safe end position E+.

After overshooting the safe end position E+ (equally of course in the case of E−), that is when the axis goes into a traversing range 2 beyond the permissible traversing range 1, a stop and alarm response is consequently initiated as before, by which the axis is brought to a standstill and further traversing commands are initially suppressed. In addition, other monitoring is switched on, which indicates that a safe end position E+ was overshot. This only has the consequence of, for example, a "safe end position +/− overshot" message and does not prevent further traversing commands.

After going over into the standstill situation and switching on of dependable monitoring of the standstill of the axis, the monitoring of the safe end positions E+ and E− is automatically switched off by the system. During activated monitoring for the standstill of the axis, the latter may only move in a narrow permissible traversing range 3, which is defined by an upper limit S1 and a lower limit S2.

At the same time, further monitoring is automatically activated, referred to hereafter as "monitoring for the freeing range of safe end positions". This permissible traversing range 4 when monitoring for the freeing range is defined by two limit values G1 and G2.

The limit value G1 in the traversing direction which led to the overshooting of the safe end position E+ corresponds in this case to the value S1 of the dependable monitoring of the standstill situation, that is the greater value of the limits S1 and S2. For overshooting of the safe end position E− in the negative transversing range, the "more negative" value, that is the likewise greater value of S1 and S2 in absolute terms, is to be set.

The limit value G2 in the other traversing direction (here in the direction E−) is set to the value of the corresponding safe end position. Here, this is as the value E−. Consequently, the following applies for the limit values for fixing the traversing range 4 when monitoring for the freeing range of safe end positions for the example shown in FIG. 1:

$$G1 = S1 \text{ and } G2 = E-.$$

Consequently, further traversing in the "wrong" direction beyond the limits of the dependable monitoring for a standstill is monitored, and if the limit is overshot is prevented by bringing the axis to a standstill once again.

With a processing reset, the response to the alarm triggered by running over the safe end position E+ is cancelled and the dependable monitoring for a standstill is likewise cancelled. Consequently, traversing commands are possible once again; the axis can be moved.

As already mentioned above, at this time the "monitoring for the freeing range of safe end positions" continues to be active, so that protection for man and the machine is ensured at all times. The defective situation is also brought to the attention of an operator by the "safe end position +/− overshot" message.

By moving the axis back into the normal traversing range, the "safe end position +/− overshot" message is automatically withdrawn when the safe end position E+ is undershot. The monitoring for safe end positions E+ and E− is automatically switched on again. Furthermore, the "monitoring for the freeing range of safe end positions" is automatically switched off again. Consequently, the initial state is restored; the axis is again in the normal operating state.

The function is supported by status signals which indicate which safe end position E+ or E– was overshot (positive or negative limit value). With these status signals it is possible to prevent possible traversing commands in the "wrong" direction and consequently to make operator control of the machine easier.

With the aid of this functionality, the safe state of the machine is never left and safety for man and the machine is ensured at all times. The initial state of the machine is restored without further operator actions, and consequently normal operation of the machine is possible again.

By contrast, the previous ways of bringing the machine from the standstill state back into the normal operating state entail increased effort, either for the machine manufacturer or the machine operator, lower availability of the machine and/or at times compromised protection for man and the machine, which can be considerably reduced by the stated invention.

What is claimed is:

1. A method for automatically freeing an axis which, after overrunning a safe end position is monitored to ascertain when the axis is at a standstill, comprising switching off the monitoring for overrunning the safe end positions; defining a freeing range by setting a first limit value in the axis's traversing direction which led to the overrunning of the safe end position to the greater limit in absolute terms of a monitored standstill range of the axis; setting a second limit value in the axis's other traversing direction, to a value of the safe end position which corresponds to said direction for activating monitoring of overrunning a freeing range;

deactivating the monitoring for a standstill of the axis; moving the axis back into a normal traversing range within the safe end positions; activating the monitoring for overrunning the safe end positions; and deactivating the monitoring for overrunning the freeing range.

2. The method according to claim 1, further comprising signaling an overrunning of a safe end position.

3. The method according to claim 1, further comprising inhibiting traversing commands in the traversing direction of the axis which led to the overrunning of the safe end position with active monitoring for overrunning of the freeing range.

4. A numerical control for safely moving an axis, comprising a monitor for monitoring a permissible traversing range of the axis within safe end positions; a monitor for monitoring overrunning of a standstill range of the axis, which can be activated after overrunning a safe end position; and a monitor for monitoring for overrunning of a freeing range defined by a first limit value in the axis's traversing direction which led to the overrunning of the safe end position having a value of the greater limit in absolute terms of the monitored standstill range of the axis, and by a second limit value in the axis's other traversing direction having the value of the corresponding safe end position corresponding to said direction, wherein it is possible to move the axis back into a normal traversing range within the safe end positions after deactivation of the means for monitoring for overrunning of a standstill range while monitoring for overrunning of the freeing range.

5. The numerical control according to claim 4, comprising a signal for signaling an overrunning of the traversing range.

6. The numerical control according to claim 4, comprising a device for generating a status signal with a value for the safe end position which was overrun, whereby traversing commands in the axis's traversing direction correspond to the value of the status signal are inhibited when there is active monitoring for overrunning of the freeing range.

7. The numerical control according to claim 4, comprising a position sensor system for recording respective actual position values of the axis for activating the monitors.

8. The numerical control according to claim 4, comprising a first limit switch and a second limit switch for recording when the axis overruns a safe end position for activating the monitors for monitoring a permissible traversing range of the axis.

9. The numerical control according to claim 4, wherein the respective monitors are provided in a two-channel form.

10. The numerical control according to claim 4, further comprising means for automatically freeing an axis after overrunning a safe end position.

* * * * *